United States Patent [19]
Takebayashi et al.

[11] Patent Number: 4,963,040
[45] Date of Patent: Oct. 16, 1990

[54] HEAT-RESISTANT BALL BEARING

[75] Inventors: Hiroaki Takebayashi; Kouichi Yamauchi; Koji Naruse, all of Osaka, Japan

[73] Assignee: Koyo Seiko Co., Ltd., Osaka, Japan

[21] Appl. No.: 497,751

[22] Filed: Mar. 21, 1990

Related U.S. Application Data

[63] Continuation of Ser. No. 236,994, Aug. 26, 1988, abandoned.

[30] Foreign Application Priority Data

Aug. 26, 1987 [JP] Japan .................... 62-129395
Nov. 7, 1987 [JP] Japan .................... 62-281814[U]

[51] Int. Cl.$^5$ ............................ F16C 33/44
[52] U.S. Cl. ........................ 384/492; 384/527; 384/531; 384/907.1
[58] Field of Search ............. 384/492, 907.1, 913, 384/527, 576, 531

[56] References Cited

U.S. PATENT DOCUMENTS

| | | | |
|---|---|---|---|
| 3,162,493 | 12/1964 | Hanau | 384/527 |
| 3,472,567 | 10/1969 | Johnson | 384/527 |
| 4,324,444 | 4/1982 | Buczynski et al. | 384/531 |
| 4,634,300 | 1/1987 | Takebayashi et al. | 384/492 |

Primary Examiner—Lenard A. Footland
Attorney, Agent, or Firm—Birch, Stewart, Kolasch & Birch

[57] ABSTRACT

A heat-resistant ball bearing comprising inner and outer races made of a heat-resistant steel, a plurality of balls made of a ceramic, and a crown retainer made of graphite. Preferably, the retainer has a crown shape and comprises a plurality of projections forming a pocket and a cut-away portion connected to the pocket. The width of the cut-away portion is selected to be about 97 to 99% of the diameter of the ball.

14 Claims, 5 Drawing Sheets

HEAT-RESISTANT BALL BEARING

This application is a continuation of application Ser. No. 07/236,994 filed on Aug. 26, 1988, now abandoned.

BACKGROUND OF THE INVENTION

The present invention relates to a heat-resistant ball bearing suitable for the use in a high temperature atmosphere within a heat treating furnace and, more particularly, to a retainer of such a heat-resistant ball bearing.

Conventionally, a slide bearing is utilized for a heat treating furnace. However, the slide bearing provides a relatively large frictional resistance, so that a large amount of power is consumed due to friction. Instead of the slide bearing, a rolling bearing, made entirely of heat-resistant steel with a solid lubricant may be used. However, the solid lubricant is partially worn away, a roller and a race, both made of the same material, tend to bake and adhere together.

Thus, no bearing suitable for a heat treating furnace has been proposed.

SUMMARY OF THE INVENTION

Accordingly, it is an object of the present invention to provide an improved heat-resistant ball bearing suitable for use in a high temperature atmosphere.

It is another object of the present invention to provide an improved retainer of a heat-resistant ball bearing suitable for use in a high temperature atmosphere.

Briefly described, according to a first preferred embodiment of the present invention, a heat-resistant ball bearing is provided which comprises inner and outer race means made of a heat-resistant steel, a plurality of balls made of a ceramic material, and crown retainer means made of graphite. The crown retainer means is guided with the inner race means. In second preferred embodiment of the present invention, the crown retainer suitable for a heat-resistant ball bearing comprises a retainer body having a crown shape and made of graphite, a plurality of projections forming a pocket and a cut-away portion connected to the pocket. The pocket stores a ball and the width of the cut-away portion is selected to be about 97 to 99% of the diameter of the ball.

BRIEF DESCRIPTION OF THE INVENTION

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
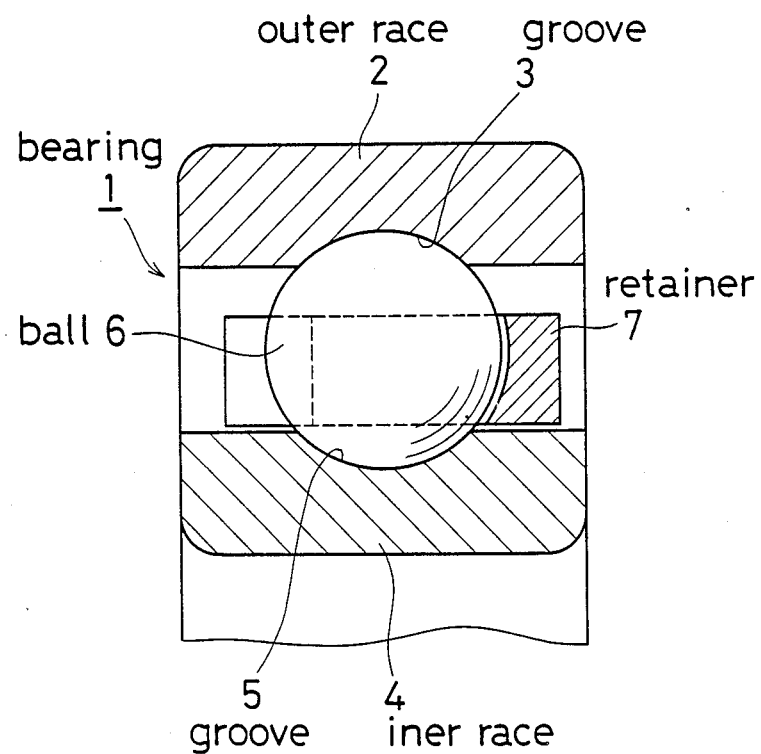
FIG. 1 shows a cross-sectional view of the upper parts of a heat-resistant ball bearing according to a first preferred embodiment of the present invention.

FIG. 1 shows a cross-sectional view of upper parts of a heat-resistant ball bearing 1 according to a first preferred embodiment of the present invention. The heat-resistant ball bearing 1 as illustrated is of a deep groove type. The heat-resistant ball bearing 1 comprises an outer race 2 with a groove 3 on its rolling face, an inner race 4 with a groove 5 on its rolling face, a plurality of balls 6 interposed between the groove 3 of the outer race 2 and the groove 5 of the inner race 4, and a crown retainer 7 for rotatably retaining the balls 6. The crown retainer 7 is guided by the inner race 4.

According to the present invention, the outer and the inner races 2 and 4 are made of a heat-resistant steel such as a high-speed steel (AISI M 50 equivalent to JIS SKH 4), the balls 6 are made of a ceramic comprising baked silicon nitride, and the crown retainer 7 is made of carbon graphite containing a chrome oxide which is a solid lubricant.

The lubricating condition of the thus constructed heat-resistant ball bearing 1 is very good as described below. The crown retainer 7 is made of graphite which is a solid lubricant and is guided with the inner race 4. The abrasion powder caused while the inner face of the crown retainer 7 slides on the sliding face of the inner race 4 is moved and maintained between the ceramic ball 6 and the grooves 3 and 5 made which are of the heat-resistant steel different from the ceramic, the lubricating condition at that portion for the abrasion powder to stay becomes superior. Since the material of the ball 6 is different from the material of the outer race 2 and the inner race 4, the ball 6 is prevented from burning on the races 2 and 4, in addition to the above described lubricating condition. Since the crown retainer 7 is guided with the inner race 4, their contact zone becomes small as compared with the case where the crown retainer 7 is guided with the outer race 2, so that the rotation torque becomes small. The speed for the crown retainer 7 to move becomes small, so that a little centrifugal force can be applied to the crown retainer 7. Even using the crown retainer 7 made of a graphite material which is rather weak advantageously makes it possible to provide a high speed.

Figure 2:
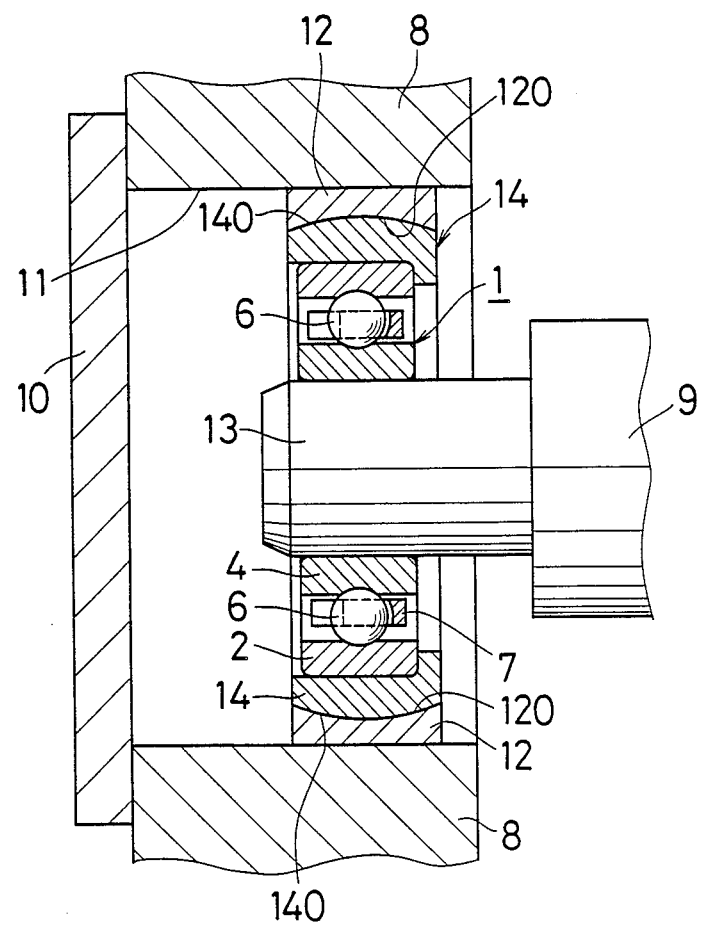
FIG. 2 shows a cross-sectional view of the heat-resistant ball bearing attached to a heat treating furnace.

FIG. 2 shows a cross-sectional view of the thus described heat-resistant ball bearing 1 attached to a heat treating furnace such as a roller hearth furnace.

In FIG. 2, walls 8 of the heat treating furnace are made of a heat-resistant steel. A roller 9 is also made of a heat-resistant steel. A plate 10 is attached to the opening end of an opening 11 between the walls 8. An aligning seat 12 is provided at the opening 11 between the walls 8. The aligning seat 12 has a curved face. Between the aligning 12 and a shaft 13 at the edge of the roller 9, the heat-resistant ball bearing 1 is set via an aligning ring 14. The aligning seat 12 and the aligning ring 14 are made of a heat-resistant steel such as a stainless steel and a high speed steel. Sliding faces 120 of the aligning seat 12 and the sliding faces 140 of the aligning ring 14 are coated with phosphate and then baked with an adhesive such as molybdenum disulfate, to improve sliding property.

The heat-resistant ball bearing 1 is provided under the condition that there is an appropriate interference between the inner races 2 and the furnace walls 8 and between the inner races 4 and the shaft 13 of the roller 9. In the heat treating furnace, the walls 8 and the shaft 13 of the roller 9 are expanded with heat. Since the outer race 2 and the inner race 4 of the heat-resistant ball bearing 1 attached to the walls 8 and the shaft 13 of the roller 9 are made of a heat-resistant steel like the materials of the walls 7 and the roller 9, the outer race 2 and the inner race 4 can be expanded with heat similar with the heat expansion of the walls 8 and the shaft 13 of the roller 9. Therefore, there is no variation in the interference between them.

Figure 3:
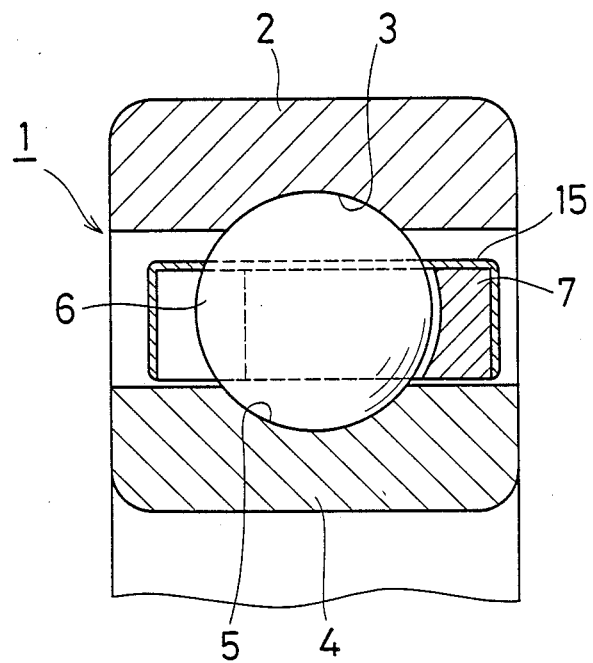
FIG. 3 shows a cross-sectional view of upper parts of a heat-resistant ball bearing according to a second preferred embodiment of the present invention.

Since the crown retainer 7 is made of graphite which is rather brittle, a reinforcement frame 15 may be provided for reinforcing the strength of the crown retainer 7. The reinforcement frame 15 is disposed over the outside of the crown retainer 7 except the sliding face as shown in FIG. 3. With the reinforcement frame 15, a possibly broken part of the crown retainer 7 may be covered by the reinforcement frame 15.

In the first preferred embodiment of the present invention, the deep groove type of ball bearing is referred to as an example of a heat-resistant ball bearing. Any other type of ball bearing can embody the present invention.

As described above, in accordance with the present invention, the heat-resistant ball bearing can be applied for a heat treating furnace, which has good adaptation of clearance and good responsibility regarding heat expansion of the shaft and flexibility of the shaft at a high temperature as compared with a rolling bearing. While the balls are made of a ceramic, the inner and outer races are made of a heat-resistant steel, so that the material of the balls is different from that of the inner and outer races.

The retainer is of a crown type, which is made of graphite being solid and having good lubricating characteristics. Therefore, good lubricating condition among the races, the balls and the crown retainer can be established to thereby prevent burning.

In case where the thus heat-resistant ball bearing is attached to a metal, the races of the heat-resistant ball are made of a heat-resistant steel having a heat expansion coefficient similar to that of the metal, so that both can similarly expand at a high temperature to prevent the variation in interference between them.

Thus, according to the first preferred embodiment of the present invention, a heat-resistant ball bearing suitable for the use in a heat treating furnace at a high temperature can be provided. The ball bearing can replace a sliding bearing with great frictional resistance.

Attention is now directed to a third preferred embodiment of the present invention in which a crown retainer for a heat-resistant ball bearing is made of graphite, so that the width of a cut-away portion of a pocket is set about 97 to 99% of the radius of the ball.

Figure 4:
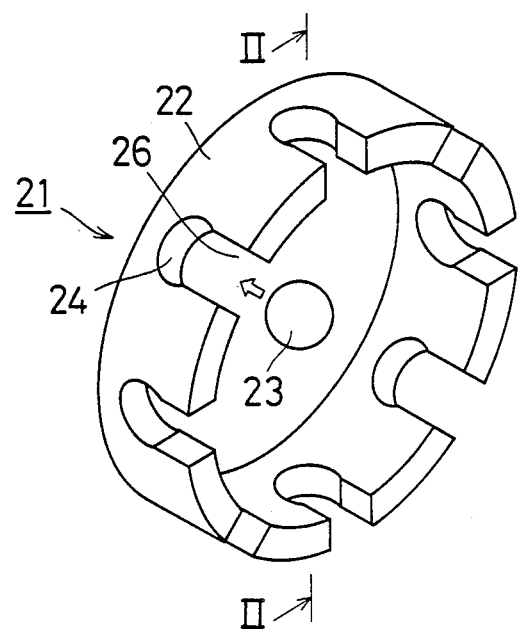
FIG. 4 shows a perspective view of a crown retainer according to a third preferred embodiment of the present invention.
Figure 5:
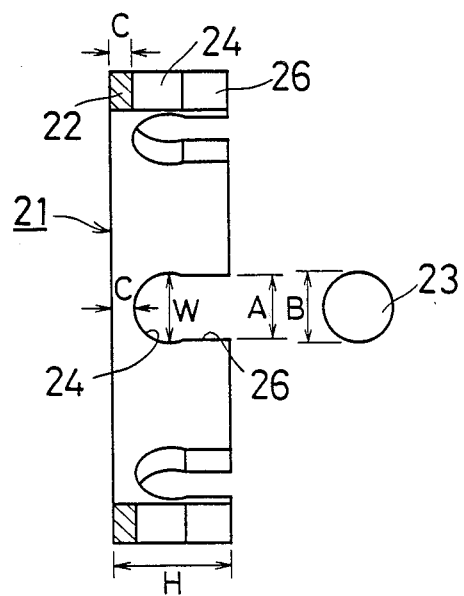
FIG. 5 shows a sectional view taken along line II—II of FIG. 4.

FIG. 4 shows a crown retainer for a heat-resistant ball bearing according to the third preferred embodiment of the present invention. FIG. 5 shows a sectional view taken on line II—II in FIG. 4.

The crown retainer 21 is made of graphite. At several points of the circumference of the retainer body 22, a plurality of pockets 24 and cut-away portions 26 connected to the pockets 24 are provided and the pockets 24 rotatably retains balls 23. The pocket 24 has a center of its radius at the center of the width H along the shaft of the retainer body 22. The cut-away portion 26 is extended from a portion of the pocket 24 to the side of the retainer body 22. The diameter W of the pocket 24 is set slightly larger than the diameter B of the ball 23 to be stored while the width A of the cut-away portion 26 along the circumference of the retainer body 22 is set about 97 to 99% of the diameter B of the ball 23.

The reason why the width A of the cut-away portion 26 is regulated is that no cut-away or crack occurs on the retainer body 22 when storing the ball 23 and, in addition, the ball 23 is prevented from falling away. This is determined by experiment with the following results:

bending strength of graphite: 600 kg f/cm$^2$
ratio of the width A with the diameter B of the ball 23: about 95 to 99%
① about 95%: damaged
② about 96%: damaged
③ about 97%: no damage
④ about 98%: no damage
⑤ about 99%: no damage The above indicates that the width A should be set about 97 to 99% of the diameter B of the ball 23. Since in the case of about 97%, a great load may be applied at the narrowest portion in the direction of the shaft when storing the ball 23, preferably, about 98 to 99% should be selected.

Figure 6:
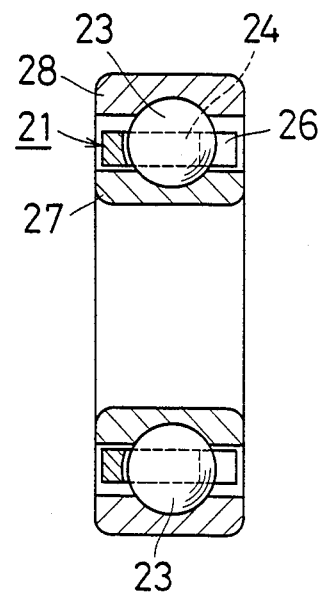
FIG. 6 shows a cross-sectional view of a ball bearing used for a performance test.

The above described crown retainer 21 made of graphite is applied to a deep groove type ball bearing as shown in FIG. 6 to examine the strength test.

In FIG. 5, an inner race 27 and an outer race 28 are provided. The crown retainer 21 is assembled so as to be guided with the inner race 27. The construction of the deep groove type ball bearing is as follows:

inner and outer races: SKH4
crown retainer: graphite (bending strength 600 kg f/cm$^2$)
ball: silicon nitride
number of the balls: 8
diameter of the balls: 3/16 inch (4,7625 mm)
inside diameter of the inner race $h_1$: 12 mm
outside diameter of the outer race $h_2$: 28 mm
width of the inner and the outer race $h_3$: 8.0 mm
inside diameter of the retainer $h_4$: 17.5 mm
outside diameter of the retainer $h_5$: 22.3 mm
thickness of the retainer D: 2.4 mm
width of the retainer H: 8.45 mm The rotation test is carried out by changing the narrowest width C of the crown retainer 21 in the direction of the shaft. The results are as follows:

testing conditions:
temperature of a high temperature furnace: 470° C.
temperature of the bearing: 400° C.
radial load: 100 kgf
rotational speed of bearing: 500 rpm With the conditions as above mentioned, the following results are obtained.

| | Narrowest width C in the direction of the shaft | Considerations |
| --- | --- | --- |
| ① | about 1.12 mm | The portion of the narrowest width C is cracked with the drive of about 2 hours. |
| ② | about 2.12 mm | No cracks or breaks appear with the drive of about 40 hours. |
| ③ | about 3.12 mm | No cracks or breaks appear with the drive of about 43 hours. |
| ④ | about 5.12 mm | No cracks or breaks appear with the drive of about 100 hours. |

This indicates that the range of the narrowest width C of the retainer body 22 in the direction of the shaft other than ① condition can offer the proper strength.

The above comparison tests are carried out with varying the width C of the narrowest portion in the direction of the shaft while the construction of the ball bearing, the thickness D of the retainer body 22, and the testing conditions are kept constant. It may be possible to vary the thickness D of the retainer body 22 while keeping the narrowest width C constant. Since the thickness D is somewhat limited by the size of the narrowest width C, the narrowest width C is varied.

Figure 7:
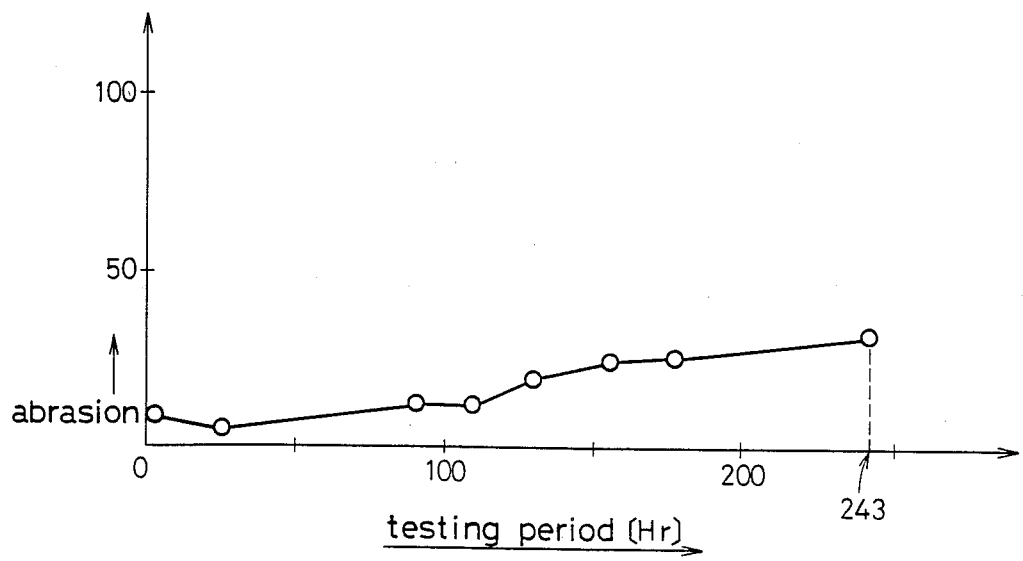
FIG. 7 shows a graph representative of the performance test.

The performance test is carried out with the ball bearing of FIG. 6 while the narrowest width C of the crown retainer 21 in the direction of the shaft is set at about 3.12 mm with reference to the above strength test. FIG. 7 shows the results.

The performance test is carried out with the condition that the load is about 50 kgf, the rotational speed of the bearing is about 100 rpm and the testing period is about 243 hours. As shown in FIG. 7, at the end of about 243 hours, the abrasion at the bearing (the radial clearance) is as small as about 34 $\mu$m. Thus it can be presumed that, if about 12.5% of the dynamic load rating is applied to the bearing (in the above test about 50 kgf), no problem occurs below 100 rpm.

According to the present invention, the cut-away portion size of the crown retainer is selected suitable with the examination, therefore, the crown retainer is prevented from being broken or cracked when the balls are pressed into the crown retainer and the stored balls should not fall away the crown retainer.

While only certain embodiments of the present invention have been described, it will be apparent to those skilled in the art that various changes and modifications may be made therein without departing from the spirit and scope of the present invention as claimed.

What is claimed:

1. A crown shaped ball retainer suitable for a heat-resistant deep groove ball bearing, comprising:
    a cylindrical retainer body made of one-piece carbon graphite and having a plurality of ball receiving pockets positioned within said retainer body and a plurality of corresponding slots extending axially from said pockets to one side of said retainer body, the diameter of said slots being smaller than the diameter of said balls.

2. The crown shaped ball retainer of claim 1, wherein the diameter of said slots is about 97 to 99% of the diameter of the ball.

3. A deep groove ball bearing apparatus adapted to operate under a no lubrication condition for use in high temperature applications comprising:
    an inner race means for supporting a rotating shaft, made of a heat-resistant steel and provided with at least one groove on its rolling face,
    an outer race means made of a heat-resistant steel and provided with at least one groove on its rolling face, said inner and outer race means being spaced apart so that the grooves on the inner and outer race means are in opposing relationship,
    spherical balls made of a ceramic material and disposed in the respective grooves of the inner and outer race means,
    a crown-shaped ball retainer means made of a one-piece carbon graphite and disposed between said inner and outer race means, said ball retainer means having a cylindrical retainer body and a plurality of ball receiving pockets positioned within said retainer body and a plurality of corresponding slots extending axially from said pockets to one side of said retainer body, the diameter of said slots being smaller than the diameter of said balls, and
    an aligning supporting means for supporting said bearing adjacent to a housing, said aligning supporting means having an aligning seat mounted at one side on said housing, and provided at the other side with a sliding groove on its inner face and an aligning ring mounted on said outer race means and provided with a spherical sliding face at its top surface for engaging said sliding groove of said aligning seat, and made of a heat-resistant steel.

4. The deep groove ball bearing apparatus of claim 3, wherein said ball retainer means is guided with said inner race means.

5. The deep groove ball bearing apparatus of claim 3, wherein said inner and outer race means, said aligning seat and said ring are made of a high-speed steel.

6. The deep groove ball bearing apparatus of claim 3, wherein said balls are made of silicon nitride.

7. The deep groove ball bearing apparatus of claim 3, wherein the diameter of said slots is about 97 to 99% of the diameter of the ball.

8. The deep groove ball bearing apparatus of claim 3, wherein the sliding surface of said aligning seat and said aligning ring are coated with a phosphate and then baked with an adhesive such as molybdenum disulfate.

9. A heat-resistant deep groove ball bearing adapted to operate under a no lubrication condition which comprises:
    an inner race means made of a heat-resistant steel and provided with at least one groove on its rolling face,
    an outer race means made of a heat-resistant steel and provided with at least one groove on its rolling face, said inner and outer race means being spaced apart so that the grooves on the inner and outer race means are in opposing relationship,
    spherical balls made of a heat-resistant material and disposed in the respective grooves of the inner and outer race means, and
    a crown shaped ball retainer means made of one-piece carbon graphite and disposed between said inner and outer race means, said ball retainer means having a cylindrical retainer body, a plurality of ball receiving pockets positioned within said retainer body and a plurality of corresponding slots extending axially from said pockets to one side of said retainer body, the diameter of said slots being smaller than the diameter of said balls.

10. The deep groove ball bearing of claim 9, wherein the diameter of said slots is about 97 to 99% of the diameter of the ball.

11. The deep groove ball bearing of claim 9, wherein said balls are made of silicon nitride.

12. The deep groove ball bearing of claim 9, wherein said inner and outer race means are made of a high-speed steel.

13. The deep groove ball bearing of claim 9, wherein said balls are made of a ceramic material.

14. The deep groove ball bearing of claim 9, wherein said ball retainer means is guided with said inner race means.

* * * * *